United States Patent
Lee

(10) Patent No.: US 6,671,506 B1
(45) Date of Patent: Dec. 30, 2003

(54) MOBILE COMMUNICATION SYSTEM FOR HOME-ZONE SERVICE AND METHOD THEREOF

(75) Inventor: Yun-Hee Lee, Songnam-shi (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/449,692

(22) Filed: Nov. 24, 1999

(30) Foreign Application Priority Data

Nov. 26, 1998 (KR) .......................................... 98-51062

(51) Int. Cl.⁷ ............................................ H04M 11/00
(52) U.S. Cl. ....................... 455/406; 455/405; 455/408; 455/462; 455/456.4
(58) Field of Search ................................. 455/405, 406, 455/408, 426, 462, 465, 552, 554, 555, 456.4

(56) References Cited

U.S. PATENT DOCUMENTS

| | | | | |
|---|---|---|---|---|
| 5,170,488 A | * | 12/1992 | Furuya | 455/465 |
| 5,295,180 A | * | 3/1994 | Vendetti et al. | 455/456 |
| 5,594,777 A | * | 1/1997 | Makkonen et al. | 455/406 |
| 5,802,468 A | * | 9/1998 | Gallant et al. | 455/422 |
| 5,983,092 A | * | 11/1999 | Whinnett et al. | 455/406 |
| 6,018,652 A | * | 1/2000 | Frager et al. | 455/406 |
| 6,018,653 A | * | 1/2000 | Hietalahti et al. | 455/406 |
| 6,044,261 A | * | 3/2000 | Kazmi | 455/408 |
| 6,205,326 B1 | * | 3/2001 | Tell et al. | 455/406 |
| 6,212,395 B1 | * | 4/2001 | Lu et al. | 455/463 |
| 6,246,886 B1 | * | 6/2001 | Oliva | 455/553 |
| 6,345,182 B1 | * | 2/2002 | Fabritius et al. | 455/408 |

FOREIGN PATENT DOCUMENTS

| | | | |
|---|---|---|---|
| CA | 2083791 | 10/1993 | H04Q/7/22 |
| CA | 2229636 | 2/1997 | H04B/7/26 |

* cited by examiner

Primary Examiner—William Trost
Assistant Examiner—Sharad Rampuria
(74) Attorney, Agent, or Firm—Cha & Reiter

(57) ABSTRACT

A mobile communication system for providing a home zone service and a method thereof. In the mobile communication system, a home zone signal generator generates a home zone signal, a mobile radio terminal receives the home zone signal and determines whether the mobile radio terminal is currently within or outside a home zone based on the strength of the home zone signal, and a base station communicates with the mobile radio terminal. A visitor location register temporarily stores a first and a second telephone numbers of a subscriber, wherein each telephone number represents different charge rates. A mobile exchange receives a call information, a mobile identification number, and the home zone in/out information from the base station and selects one of the first and second telephone numbers of a subscriber corresponding to the mobile identification number and the home zone in/out information. A billing center receives the call information and one of the selected first and the second telephone numbers from the mobile exchange and generates a service charge for the call connection.

26 Claims, 8 Drawing Sheets

MOBILE COMMUNICATION SYSTEM FOR HOME-ZONE SERVICE AND METHOD THEREOF

CLAIM OF PRIORITY

This application makes reference to, incorporates the same herein, and claims all benefits accruing under 35 U.S.C. Section 119 from an application for "Mobile Communication System for Home-Zone Service and Method Thereof" filed earlier in the Korean Industrial Property Office on Nov. 26, 1998 and there duly assigned Serial No. 98-51062.

BACKGROUND OF THE INVENTION

1. Field of the Invention

The present invention relates generally to a mobile communication system and method for providing home zone service in a wireless communication network, and in particular, to a system and method for a communication service provider to easily determine whether a wireless communication subscriber with a single terminal is within the home zone service in order to charge the subscriber at a first charge rate for the call inside the home zone service, and to charge at a second charge rate which is higher than the first charge rate, if the subscriber is located outside the home zone service.

2. Description of the Related Art

As the demand for mobile radio communication services has increased, the number of subscribers has grown exponentially. The mobile communication service providers are putting their efforts to attracting wired mobile subscribers from the competing service providers. A wired network was built a long time ago while the emerging wireless service providers were providing their services on a different network. Wired communications and wireless communications are different in many respects. The former is considered to be much more superior to the latter system the voice quality and the cost but is available only in a confined area such as inside a house or a building. As the integrated wireless and wireline communication service is not possible in the real world, these two communication networks continue to operate independently. In other words, a subscriber has to purchase a mobile telephone in addition to the telephone unit in the house to benefit from the wireless communication service. Accordingly, it is inefficient and inconvenient for a subscriber to purchase two different telephone units and have two different phone numbers due to the diverse network systems.

FIG. 1 illustrates a conventional network configuration with a wired service provider and a wireless service provider providing a communication service with two different networks. Within the cellular zone 40, the coverage area of a base station 60, a subscriber has a first telephone 10 for use inside the house and a second telephone 50 for use outside the house. A wireline service is provided through a cable extending from a PSTN (Public Switched Telephone Network) 30 via the first telephone 10 installed within the house. A wireless service is provided through the second telephone 50 that transmits/receives communication signals to/from the base station 60 within the cellular zone 40. The reference numeral 70 denotes a mobile exchange (or mobile switching center (MSC)) and the reference numeral 80 denotes a communication line between the base station 60 and the mobile exchange 70. The communication line can be achieved by an E1 or T1 link. The reference numeral 90 denotes a communication line between the mobile exchange 70 and the PSTN 30 to form a communication path between the wireless subscriber and the wired subscriber.

FIG. 2 illustrates a fixed cellular network configuration showing a cellular network for use in a confined area, such as an island, where a cable cannot be installed to provide a wired service. A stationery radio telephone 55 equipped with a wireless telephone is fixed in the house located in island and exchanges communication signals with the base station 60 in a main land. A mobile radio telephone 45 transmits/receives communication signals via the fixed radio telephone; thus, the mobile radio telephone 45 only has a limited communication area around the vicinity of the house. A dotted line indicated by the reference numeral represents the communication area 65 for the fixed radio telephone 55, in which the mobile radio telephone 45 can communicate with the outside. This communication area 65 can range from hundreds of meters to a few kilometers and also be referred as a home zone area.

Although the fixed cellular communication scheme as stated above can be considered a wireless service, it has limited mobility and coverage area. However, the call charge inside the home zone is relatively lower than the call charge outside the home zone, which is the reason why many subscribers keep both the wireless service and the wired service at home. In view of such foregoing scenario, a wireless service provider can attract other wired subscribers to use the wireless service by charging their subscribers less for the calls within the home zone that is equivalent to the wired service. Therefore, a wireless subscriber can use one mobile terminal unit for both the home zone calls and the outside a home zone calls and still have the benefit of having a lower charge rate for the home zone calls, as they did through the wired service.

FIG. 3 is a view illustrating a conventional home zone over a network and its graphical illustration for detecting the location of a subscriber in relation to the home zone area over the wireless network. The base stations 61, 63, 64, 67, and 69 surrounding a particular subscriber are used to detect the boundary of the home zone. The reference numerals 71, 73, 74, 77, and 79 denote the respective coverage areas of the base stations 61, 63, 64, 67, and 69. The home zone 81 is marked with a circle. Within the home zone 80, a signal can be received from any one of the base stations 61, 63, 64, 67, and 69. In other words, all the base stations 61, 63, 64, 67, and 69 can receive signals from the telephones 10, 50, and 55, as shown in FIG. 1 and FIG. 2. The home zone 81 cannot be as small as that of are covering the house in FIG. 1 or the communication area 65, which ranges from about 20 m to about 30 m from the center of a house in FIG. 2.

In the prior art as described above, three to eight base stations are constantly monitoring the location of the terminal at all times and notify the detected terminal location to a mobile exchange, which increases the load on the wireless network. Moreover, a subscriber cannot receive both the wired and wireless communication services using a single terminal, and an efficient billing service is not provided for an integrated wired and wireless communication service from a mobile communication service provider.

SUMMARY OF THE INVENTION

It is, therefore, an object of the present invention to provide a mobile communication system and method for providing home zone service in a wireless communication network, wherein a wireless subscriber using a single terminal is charged for the call inside a home zone at a first charge rate and the call outside the home zone at a second charge rate.

The above object is achieved by providing a mobile communication system, which includes a home zone signal generator for generating a home zone signal; a mobile radio terminal for receiving the home zone signal and for determining whether the mobile radio terminal is currently within the home zone based on the strength of the home zone signal; and, a base station for communicating with the mobile radio terminal. Accordingly, a visitor location register temporarily stores the first and the second telephone numbers of a subscriber, for which different charge rates are applied. A mobile exchange receives the call information, a mobile identification number, and the home zone in/out information from the base station and selects the first or the second telephone number of the subscriber that corresponds to the mobile identification number by referring to the visitor location register according to the home zone in/out information. A billing center receives the call information and the first and the second telephone numbers from the mobile exchange and provides billing for the call corresponding to the selected telephone number.

A BRIEF DESCRIPTION OF THE DRAWINGS

The above and other objects, features and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail because they would obscure the invention in unnecessary detail.

Figure 1:
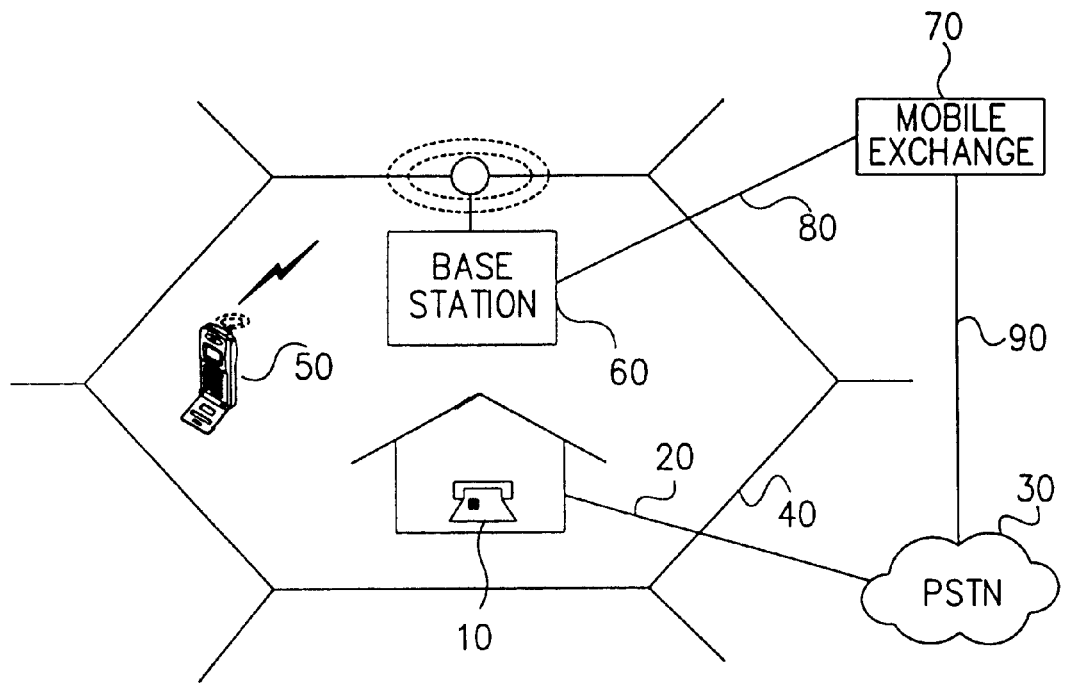
FIG. 1 illustrates a conventional network configuration showing a wired service provider and a wireless service provider both operating their respective networks.
Figure 2:
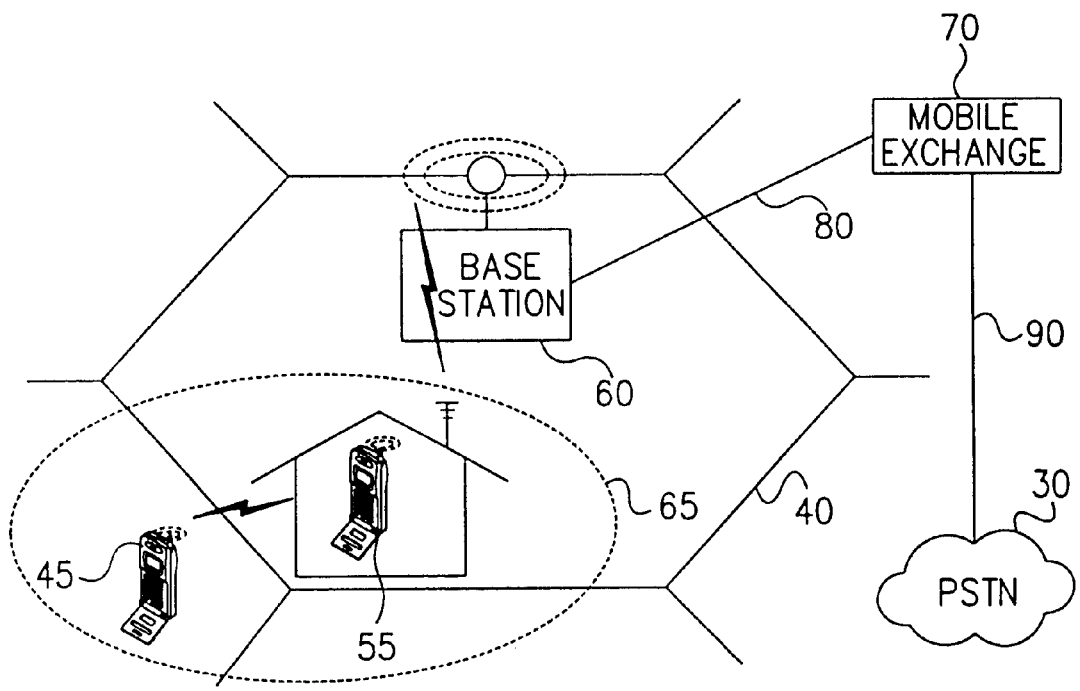
FIG. 2 illustrates a fixed cellular network configuration.
Figure 3:
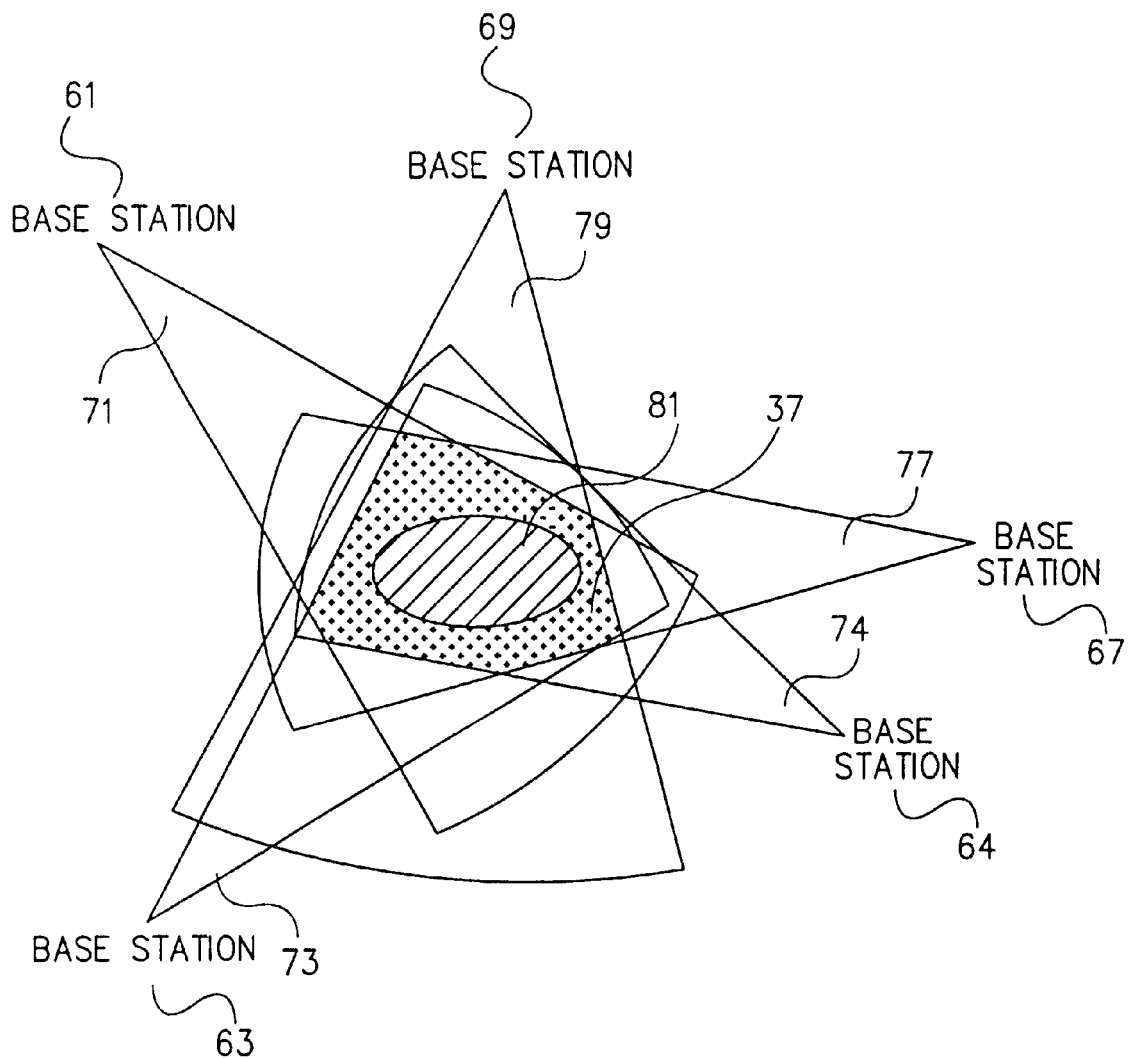
FIG. 3 illustrates a pictorial illustration defining a home zone over a network.
Figure 4:
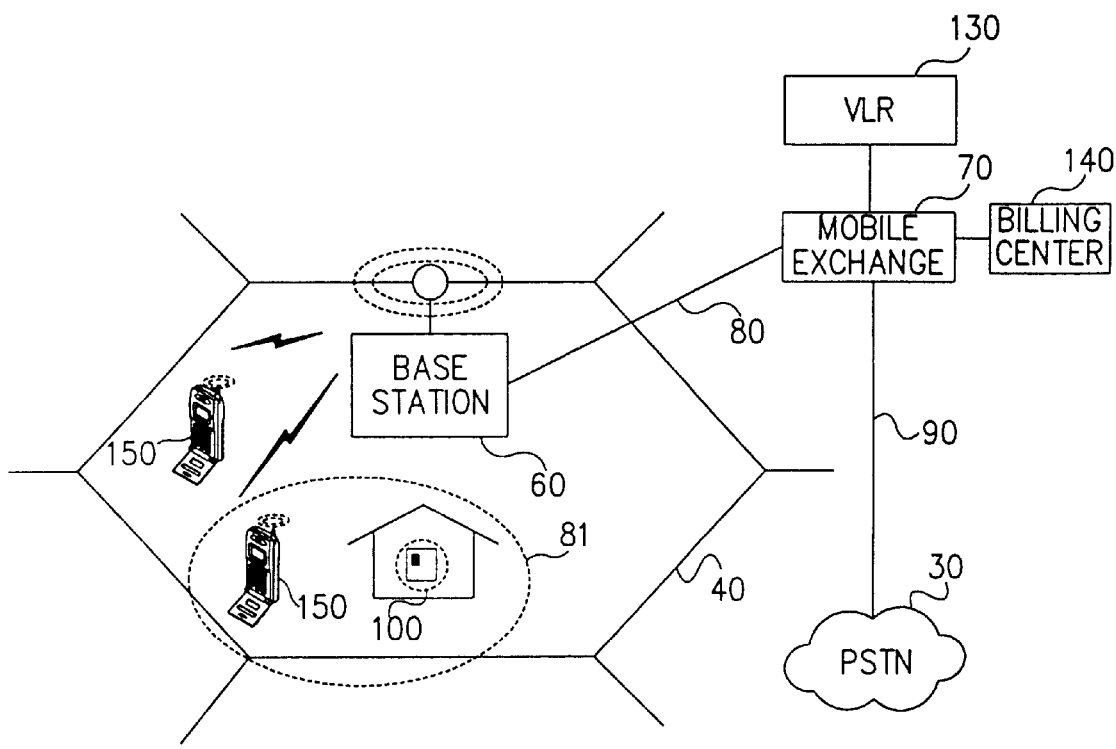
FIG. 4 illustrates a configuration of a wireless network with a wired network incorporated therein.

FIG. 4 illustrates a configuration of a wireless network with a portion of the wired network incorporated therein.

In FIG. 4, a home zone signal generator 100 generates a signal to a terminal 150 located within a home zone 81 and communicates the signal at a low transmission power within the boundary of the home zone 81. The boundary of the home zone 81 can cover the area inside the fence of the house or extended according to the strength of the signal transmitted from the home zone signal generator 100. The terminal 150 is assigned with a national significant number (NSN) for billing purposes if the call is within the home zone 81 and a mobile directory number (MDN) for billing purposes if the call is outside the home zone 81. A visitor location register (VLR) 130 temporarily stores the subscriber information including the terminal information and other service information. The NSN and MDN are stored in the VLR 130. The reference numeral 30 denotes a PSTN exchange, the reference numeral 40 denotes the coverage area of the base station 60, the reference numeral 70 denotes a mobile exchange, and the reference numeral 80 denotes a connection line between the base station 60 and the mobile exchange 70. The connection line can be an E1 or T1 link. The reference numeral 90 denotes the communication path between a wireless subscriber and a wired subscriber. The reference numeral 140 denotes a billing center for billing the subscriber based on the call information and the NSN/MDN of the subscriber received from the mobile exchange 70.

From the billing perspective, the terminal 150 can be used as a mobile unit and can be used at home or within the home zone area, as shown in FIG. 4. The terminal 150 senses the signal generated from the home zone signal generator 100, determines whether the terminal 150 is located within the home zone 81 according to the strength of the generated signal, and notifies the base station 60 of such determination. Then, depending on the reception of the home zone signal generated from the mobile terminal 150 via the base station 60, the mobile exchange 70 informs the billing center 140 of the NSN or MDN of the terminal 150 stored in the VLR 130 so that the billing center 140 can apply a different charge rate. If the home zone signal is detected, the exchange 70 retrieves the NSN of the terminal from the VLR 30, otherwise the MDN is retrieved from the VLR 30. Here, the assignment of the two telephone numbers is used only for billing purposes and thus switching to either number can not be a source to cause a call drop.

Figure 5:
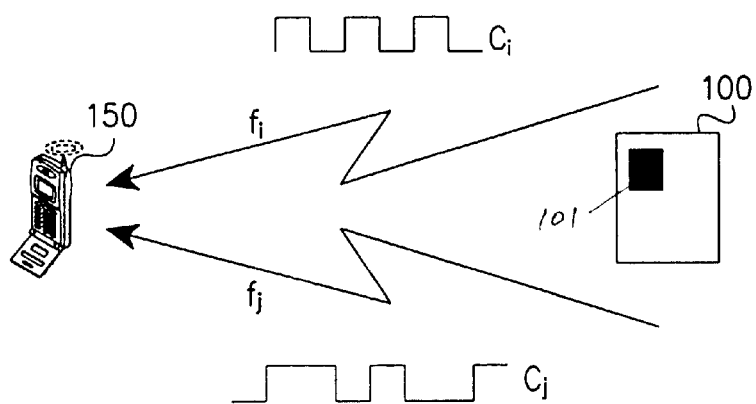
FIG. 5 illustrates communication signals for both the home zone signal generator and the mobile terminal according to an embodiment of the present invention.

FIG. 5 illustrates a communication method between the home zone signal generator 100 and the terminal 150 according to the embodiment of the present invention. In FIG. 5, the terminal 150 can receive a signal from the home zone signal generator 100 as long as the terminal 150 is located within the home zone. To this end, the terminal 150 uses the frequency to access the base station 60 through a reverse link. This aims to provide discrimination between the signal directed from the base station 60 to the terminal, and the signal directed from the home zone signal generator 100 to the terminal 150. The home zone signal generator 100 can transmit a plurality of about 10 modulation signals. By assigning a mutually agreed frequency under the frequency division scheme between the home zone signal generator 100 and the terminal 150, one of the modulation signals can be selected in order to prevent the terminal 150 from receiving other signals generated from other home zone signal generator located in the adjacent neighboring house. Accordingly, a single home zone signal generator can be shared among many terminals for each family member.

Figure 6:
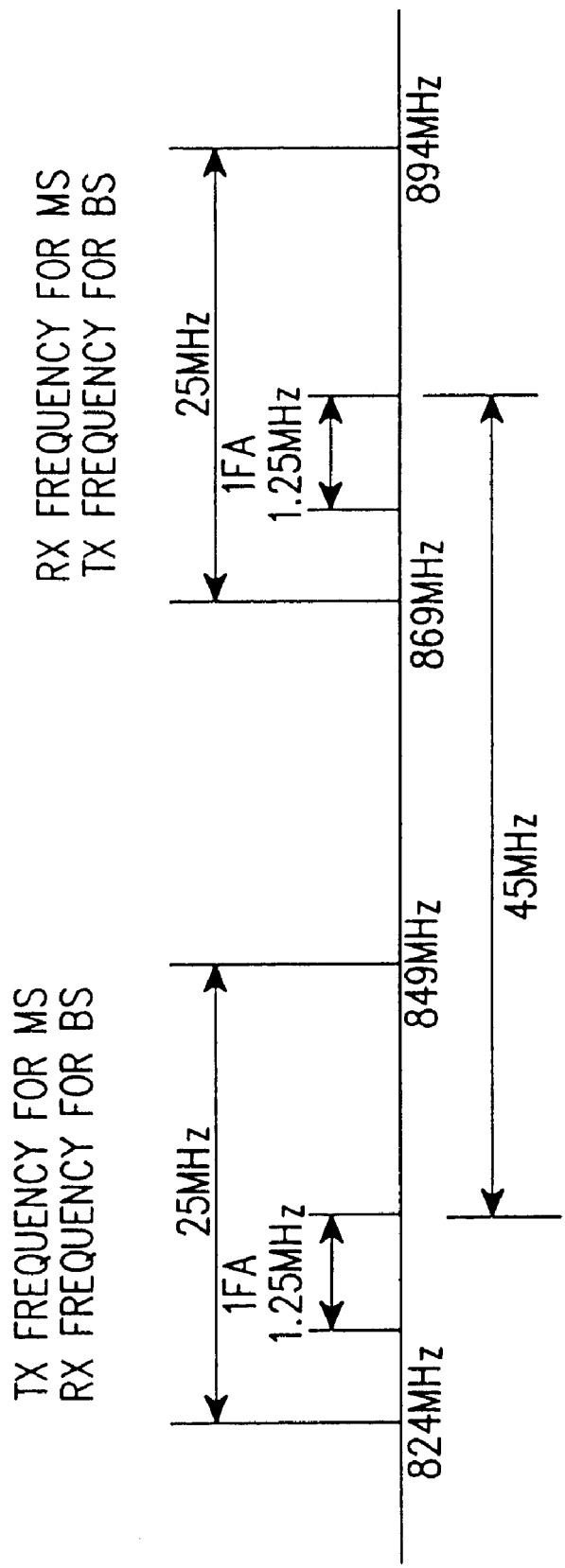
FIG. 6 illustrates a cellular frequency band of the home zone signal generated from the home zone signal generator.
Figure 7:
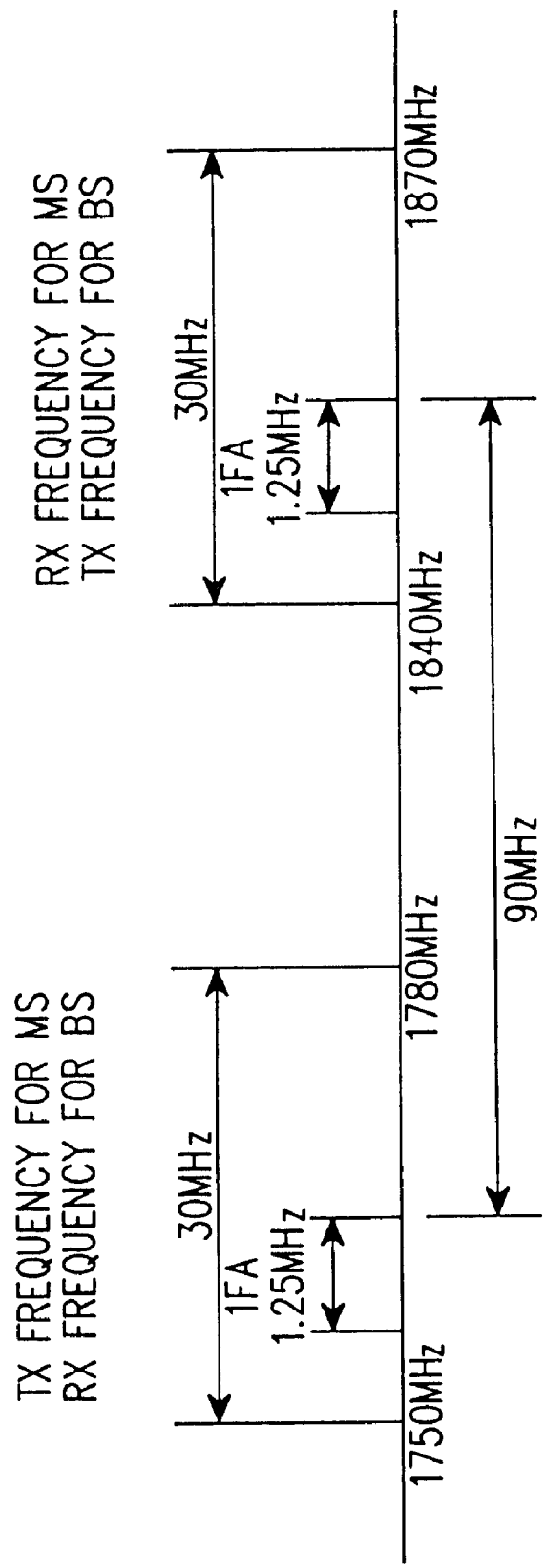
FIG. 7 illustrates a PCS (Personal Communication System) frequency band of the home zone signal generated from the home zone signal generator.

FIG. 6 illustrates a cellular frequency band (CDMA band) of the home zone signal generator, and FIG. 7 illustrates a PCS frequency band of the home zone signal generator. For communicating with the terminal 150, the home zone signal generator 100 uses the frequency that the terminal 150 uses to access the base station 60 through a reverse link. This aims to provide discrimination between the signal detected from the base station 60 to the terminal 150, using one antenna, and the signal directed from the home zone signal generator 100 to the terminal 150. The home zone signal in form a cellular frequency band or a PCS frequency band through the reverse link does not interfere with other signals since the band width of the home zone signal is outside the band width for the cordless phone (900 MHz) or the paging frequency). The home zone signal generator 100 has nothing to do with the communication signals and simply generates a specific signal with a low transmission power to avoid any interference with any other communicating signals. Thus, the home zone signal generator 100 can be fabricated at a low cost.

Figure 8:
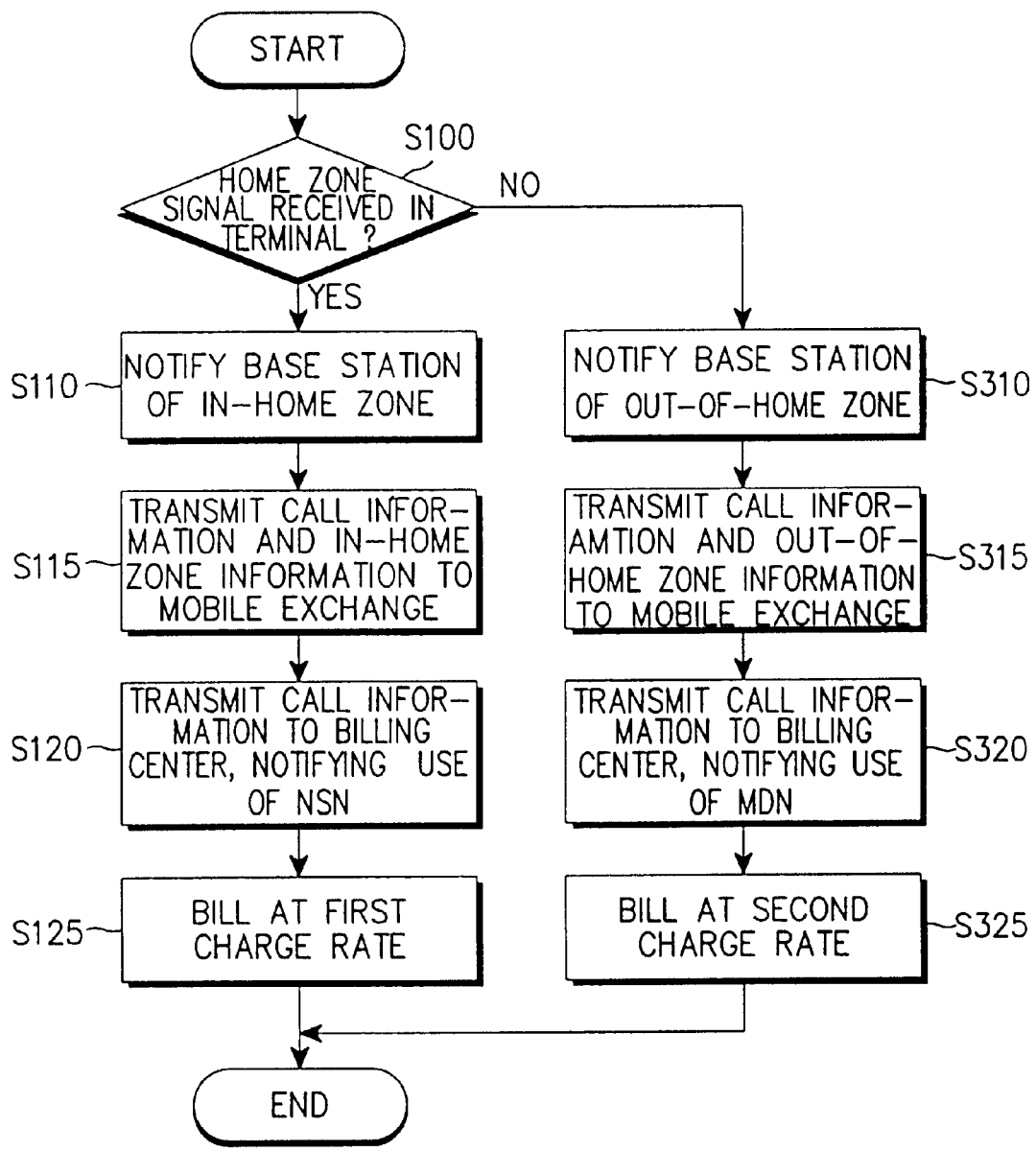
FIG. 8 is a flowchart depicting a method of applying a different charge rate depending on the call being inside/outside of the home zone according to the embodiment of the present invention.

FIG. 8 is a flowchart depicting a method of applying a different charge rate depending on the call being within/outside of the home zone. In step S100, the terminal 150 determines whether a home zone signal has been received from the home zone signal generator 100 after the initial dialing or in the middle of the call connection. Upon detecting the home zone signal, the terminal 150 transmits a signal to the base station 60 to notify that the terminal 150 is located within the home zone, in step S110. Then, the base station 60 transmits the call information to the mobile exchange 70 as well as the detected home zone signal to notify that the terminal 150 is within the home zone, in step S115. The call information includes the starting time and the terminating time of the call and a mobile identification number (MIN). In step S120, the mobile exchange 70 transmits the call information to the billing center 140 and selects the NSN of the terminal 150 from the VLR 130 corresponding to the MIN received from the base station 60. Accordingly, the billing center 140 calculates the call charge of the terminal 150 at a first charge rate that is comparable to the charge rate for a wired call, in step S125. The calculated value is recorded for billing the subscriber.

Similarly, if the terminal 150 fails to receive the home zone signal in step S100, the terminal 150 notifies the base station 60 that the terminal 150 located outside the home zone, in step S310. Then, the base station 60 transmits the call information to the mobile exchange 70, notifying that the terminal 150 is located outside the home zone, in step S315. The mobile exchange 70 transmits the call information to the billing center 140 and selects the MDN of the terminal 150 from the VLR 130 corresponding to the MIN received from the base station 60, in step s320. The billing center 140 calculates the call charge of the terminal 150 at a second charge rate that is comparable to a wireless call charge, which is substantially higher than the first charge rate, in step S325. Then, the calculated value is recorded as the call charge for the corresponding MDN of the terminal 150.

When the call initiates and progresses within the home zone, the steps S100 to S125 are sequentially performed. On the other hand, if the call initiates and progresses outside the home zone, the steps S310 to S325 are sequentially performed. Moreover, according to another embodiment of the present invention, a different billing scheme can be applied to a call if the terminal 150 moves out of the home zone in the middle of the conversation in the former case, or if the terminal 150 enters the inside of the home zone during the conversation in the latter case. Therefore, the call information includes such interruption to reflect the change of the home zone for billing purposes. To this end, the call information, which is transmitted to the mobile exchange, reflects two different starting and ending times, one for the call within the home zone and the other for the call outside the home zone. It is noted that the description of process involving when the base station transmits the call information to the mobile exchange or from the mobile exchange to the billing center will be omitted herein because it is not within the scope of the present invention.

Whenever there is a call request for call origination or call termination, the reception of the home zone signal should be checked for determining an appropriate charge rate. Thus, the step S100 can be applied to the call termination as well as the call origination. If a call is incoming, the terminal 150 determines whether a home zone signal has been received from the home zone signal generator 100 and notifies the base station 60 that the terminal 150 is within the home zone before the call set-up. Then, the mobile exchange 70, notified of the terminal 150 being within the home zone by the base station 60, transmits the NSN of the terminal 150 to the billing center 140, so that the first charge rate is applied to the call. On the contrary, if the home zone signal is not received, the terminal 150 notifies the base station 60 and the mobile exchange 70 is informed of the terminal 150 as being outside the home zone by the base station 60, then transmits the MDN of the terminal 150 to the billing center 140 so that the second charge rate can be applied to the call. Accordingly, an appropriate call charge rate can be determined when a mobile subscriber makes a call or receives a call from other terminal.

Figure 9:
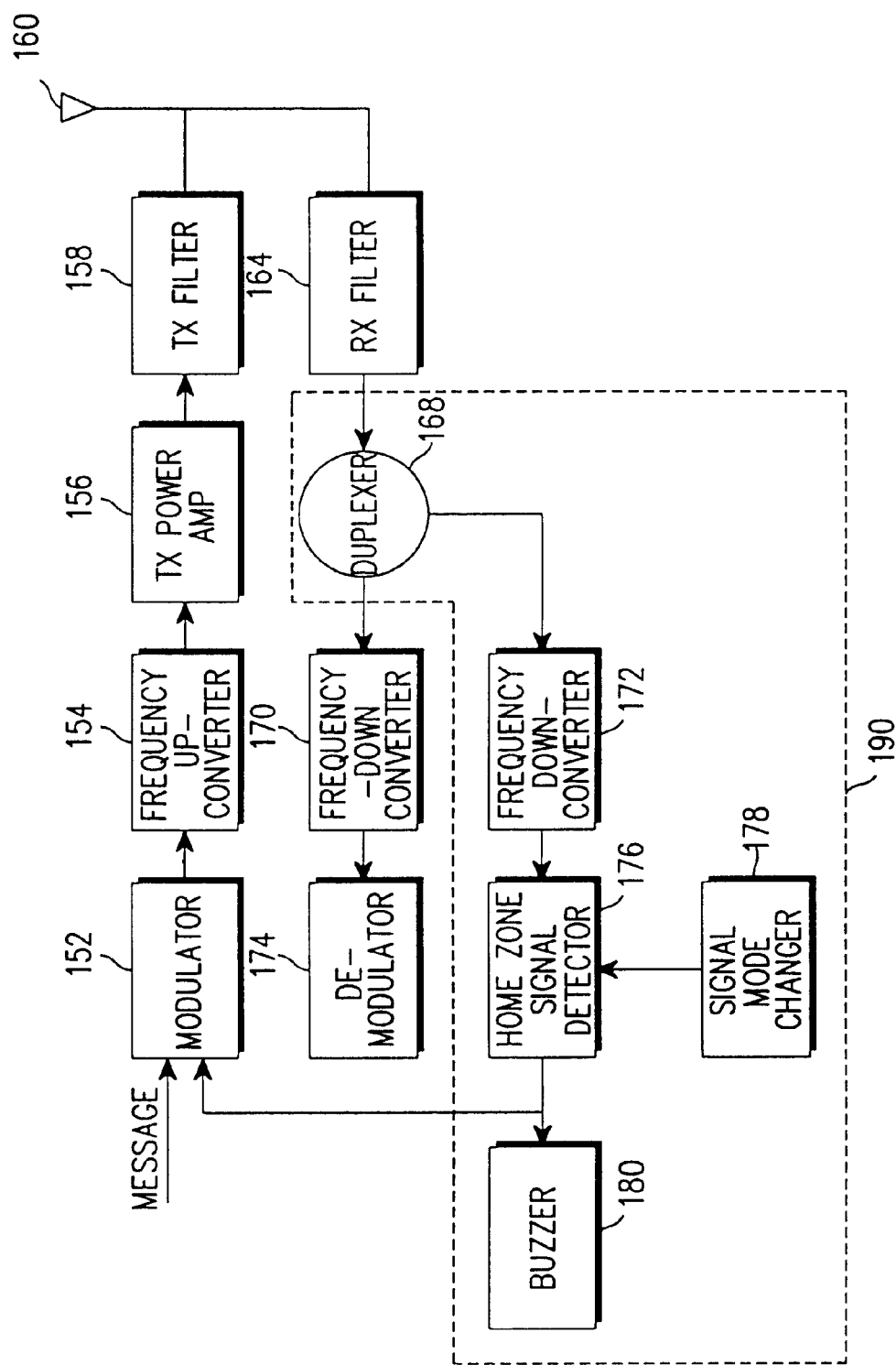
FIG. 9 is a block diagram of inside of the mobile terminal for detecting the home zone in a wireless communication network; and, FIG. 10 is a graphical illustration in setting the adjacent base stations for detecting the home zone according to the embodiment of the present invention.

FIG. 9 is a block diagram of a terminal of a wireless communication network according to the embodiment of the present invention. In FIG. 9, a modulator 152 of the terminal 150 modulates the transmission signal and the signal indicating whether the reception of a home zone signal from the home zone signal generator 100 is received by a home zone signal detector 176. The existing antenna 160 of the terminal 150 can be used to receive the home zone signal, thereby obviating the need for procuring an additional antenna. Thus, there is no large increase in the fabrication cost by providing the additional components in the terminal 150 according to the embodiment of the present invention. A frequency up-converter 154 up-converts the frequency of the output signal of the modulator 152, and a transmission power amplifier 156 amplifies the output power of the up-converted signal received from the frequency up-converter 154. A transmission filter 158 removes any signals beyond a transmission frequency band from the amplified signal received from the transmission amplifier 156 in order to prevent the interference with other frequency bands in the air. The transmission antenna 160 amplifies the output signal of the transmission filer 158 and transmits the filtered signal to a predetermined direction. The antenna 160 also serves to receive a signal and amplifies the received signal. A reception filter 164 removes any signals beyond the reception frequency band from the signal received via the antenna 160. A duplexer 168 serves as a signal separator for separating the signal transmitted from the base station 60 and the signal generated from the home zone signal generator 100. A frequency down-converter 172 down-converts the frequency of a signal received from the duplexer 168 so that the signal of the duplexer 168 can be used for regular communication purposes. Another frequency down-converter 172 down-converts the frequency of the output signal of the duplexer 168 so that the output signal from the home zone signal generator can be detected by the home zone signal detector 176. A demodulator 174 demodulates the signal received from the base station 60. The home zone signal detector 176 detects the signal generated from the home zone signal generator 100. A signal mode changer 178 sets various signal modes so that the home zone signal detector 176 can detect the signal generated from the home zone signal generator 100 depending on the setting of the signal mode of the home zone signal generator. Thus, the terminal 150 can be prevented from being tuned to the home zone signal generated from a different home zone signal generator when the same signal mode is used. A buzzer 180, when notified of the detection of the home zone signal by the home zone signal detector 176, generates an audible sound or operates a light emitting diode (LED) to notify the subscriber that the terminal 150 is within the home zone.

Among the above described components, a dotted line 190 including the duplexer 168, the frequency downconverter 162, the home zone signal detector 176, the signal mode changer 178, and the buzzer 180 represents the home zone signal receiver portion of the terminal 150. The home zone signal receiver 190 is added to a conventional terminal according to the feature of the present invention to detect the home zone signal and notify the base station 60 whether the terminal 150 is within or outside the home zone. The operation of the home zone signal receiver 190 will be described in more detail.

If the home zone signal detector 176 fails to detect a home zone signal generated from the home zone signal generator 100 before, during or after the call, the terminal 150 notifies the base station 60 the status of such non-detection of the home zone signal. Then, the base station 60 in turn notifies the mobile exchange 70 of the non-detection of the home zone signal so that a higher charge rate for the wireless service. A signal indicating whether the terminal 150 within or outside the home zone is transmitted through an access channel which is used to set the protocol during the initial call set-up process, or transmitted through a traffic channel which is used to set the protocol and to transmit the voice and data signals during the call connection.

In CDMA, an order field and an information record field are present in both the access channel and the traffic channel. Hence, the signal indicating whether the terminal is within/outside the home zone can be transmitted using these fields. While the order field and the information record field are reserved for later use in the IS-95 standard for the air interface, it is assumed that these two fields can be used for transmitting such signals. See tables 6.7.3-1 and 6.7.4-1 set forth in the IS-95 standard for the details of the order field and the information record field.

In the components of the terminal 150 as shown in FIG. 9, the signal mode changer 178 is provided to change the signal mode for detecting the home zone signal without interference from other home signal generator. The home zone signal generator 100 is also equipped with the same signal mode changer 101 as illustrated in FIG. 5, which has a transmission power low enough to support the home zone signaling function. Within the home zone, the terminal 150 senses the signal from the home zone signal generator 100 and notifies the base station 60 that the terminal 150 is located within the home zone. Because the charge rate is higher for the call outside the home zone, a subscriber inadvertently moving out of the home zone 81 can be alerted of such escape through the buzzer 180 and has a chance to re-enter the home zone 81 to avoid the higher charge.

Figure 10:
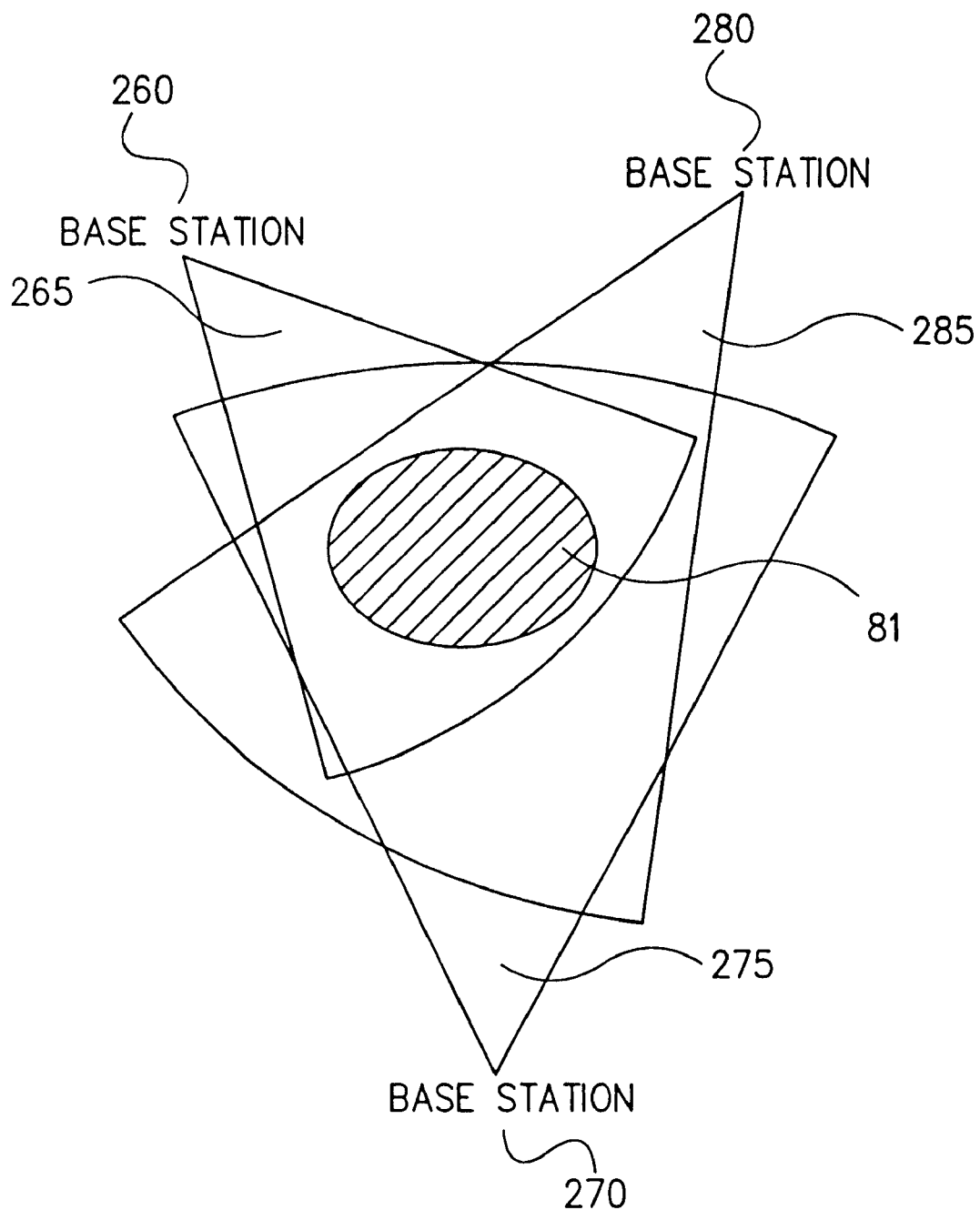

FIG. 10 describes a method of setting adjacent base stations according to the embodiment of the present invention. In some cases, a subscriber may suffer a loss or gain benefit in the event that the home zone signal generator 100 is moved to a different location. For example, a subscriber may move the home zone signal generator 100 from its registered location to another area and create an environment to simulate the home zone for the lower charge rate even though the subscriber in fact has moved outside the home zone. To prevent such improper conduct, it is necessary to check whether the terminal 150 is considered to be within the home zone 81 is actually located in the home zone 81. For this purpose, three base station, or at least one adjacent base station, to which the subscriber is registered is detected and stored in a cell list, as shown in FIG. 10. The information relating to the adjacent base stations is stored in the subscriber information database of the mobile exchange 70, as shown in table 1.

TABLE 1

| name | address | first phone number | second phone number | first sector | second sector | third sector | remark |
|---|---|---|---|---|---|---|---|
| Liu | Sunnyvale | 0342-779-8180 | 011-779-xxxx | #32 | #66 | #96 | |
| Mike | Palo Alto | 0999-999-9999 | 011-yyy-yyyy | #10 | | | |
| — | — | — | — | — | — | — | — |

According to table 1, each subscriber is assigned to an NSN (first phone number) for calls within the home zone 81 and an MDN (second phone number) for calls outside the home zone 81. The base station sector information associated with the subscriber is expressed using a PN (Pseudorandom Noise) code or other data. Each subscriber can be assigned to one to three sectors. In FIG. 10, the reference numerals 260, 270, and 280 denote each sectored base station. If the base station information transmitted to the mobile exchange 70 represents one of the base stations 260, 270, and 280 at the initial call set-up stage, it is considered that the terminal is within the home zone 81. The signal of the home zone signal generator and the base station information are checked together to prevent illegal activities by a few subscribers. That is, the home zone signal generator can be moved, allowing the subscriber to maintain the lower billing rate by faking the home zone calls. Moreover, the home zone signal can be designed to generate low AC signals instead of DC signals in order to limit the propagation distance, and the home zone signal should be check in the middle of the call connection. Furthermore, a big load is not imposed on the network.

As described above, the present invention has the following advantages: (1) a reduced load is imposed on the network since the base station notifies the mobile exchange so that a different billing scheme is applied only in the event that the terminal has not received the home zone signal from a home zone signal generator; (2) the size of the home zone can be reduced. Installing the home zone signal generator enables a predetermined area to be set for each subscriber and the home size can be controlled for reduction; (3) accurate charges for the call can be calculated; and, (4) accuracy with which the cost is laid onto subscriber because the home zone signal generator can help to generate an appropriate service charge depending on whether the terminal is located within or outside the home zone.

While there have been illustrated and described what are considered to be the preferred embodiments of the present invention, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A mobile communication system for providing a different billing scheme for a call connection to a subscriber, comprising:

means for generating a home zone signal defining a boundary of home zone;

a mobile terminal for receiving the home zone signal and for determining whether the mobile terminal is currently located within the boundary of the home zone;

a base station for communicating information signals with the mobile terminal;

a visitor location register for temporarily storing a first telephone number and a second telephone number of the subscriber;

a mobile exchange unit for receiving the call information, a mobile identification number, and the home zone signal from the base station and for selecting one of the first telephone number and the second telephone number of the subscriber in response to the mobile identification number and the home zone signal; and, billing means for generating a service charge to the subscriber in response to the call information and one of the first telephone number and the second telephone number selected by the mobile exchanges, wherein a predetermined area that defines the boundary of the home is variable for each individual subscriber by a signal strength setting of the means for generating a home signal.

2. The mobile communication system of claim 1, wherein the means for generating the home zone signal generates the home zone signal via a reverse link.

3. The mobile communication system of claim 2, wherein the means for generating the home zone signal generates the home zone signal in the form of a CDMA (Code Division Multiple Access) frequency band.

4. The mobile communication system of claim 2, wherein the means for generating the home zone signal generates the home zone signal in the form of a PCS (Personal Communication Service) frequency band.

5. The mobile communication system of claim 1, wherein the mobile exchange unit includes a cell list having a PN information of at least one adjacent base station initially assigned to cover the home zone signal generator for determining whether the mobile terminal is within the boundary of the home zone that is covered by the base station initially assigned to cover the home zone signal generator.

6. The mobile communication system of claim 1, wherein the means for generating the home zone signal is capable of selectively generating a plurality of home zone signals in a given frequency band and one of the plurality of the home zone signals is mutually assigned between the generating means and the mobile terminal to avoid any interference from neighboring generating means.

7. The mobile communication system of claim 1, wherein the mobile terminal informs the base station in the event that the mobile terminal fails to receive the home zone signal during an initial call set-up or during the call connection via a reverse channel.

8. A mobile communication system for providing a different billing scheme for a call connection to a subscriber, comprising:

a home zone signal generator for generating a home zone signal defining a boundary of a home zone, wherein a predetermined area that defines the boundary of the home zone is variable according to an individual subscriber;

a base station;

a mobile terminal for receiving the home zone signal from the home zone signal generator and for transmitting the detected home zone signal to the base station indicating whether the mobile terminal is currently located within the boundary of the home, the mobile terminal comprising:

signal separator means for separating a signal received from the home zone signal generator and a signal received from the base station;

a home zone signal detector coupled to the output of the signal separator means for detecting the output signal from the signal separator;

modulating means coupled to the output of the home zone signal detector for modulating the detected home zone signal; and, transmitting means coupled to the output of the modulating means for processing the modulated home zone signal and for transmitting the processed home zone signal to the base station via an antenna.

9. The mobile communication system of claim 8, wherein the home zone signal generator selectively transmits a plurality of modulated home zone signals in a given frequency band.

10. The mobile communication system of claim 9, wherein the mobile terminal further includes a signal mode changer coupled to the home zone signal detector for selecting one of the modes to which the home zone signal generator can detect the incoming home zone signal from the home zone signal generator.

11. The mobile communication system of claim 8, wherein the mobile radio terminal further includes a buzzer for producing an alarm signal to the subscriber indicating that the mobile terminal is located within a home zone upon detecting the home zone signal.

12. The mobile communication system of claim 11, wherein the buzzer generates an audible sound.

13. The mobile communication system of claim 11, wherein the buzzer comprises a light emitting diode to produce a light signal to the subscriber upon detecting the home zone signal.

14. A mobile communication system for providing a different billing scheme for a call connection to a subscriber, comprising:

a home zone signal generator for generating a home zone signal defining a boundary of home zone, wherein a predetermined area defining the boundary of the home is variable according to a specific subscriber;

a base station for communicating information signals;

a mobile terminal for receiving the home zone signal from the home zone generator and the information signals from the base station and for transmitting the home zone signal to the base station indicating whether the mobile terminal is currently located within the boundary of the home, the mobile terminal comprising:

an antenna for transmitting/receiving the information signals to/from the base station;

a reception filter coupled to the antenna for removing signals beyond a given reception frequency band from the received information signals received from the antenna;

a duplexer coupled to the output of the reception filter for separating the signals received from the reception filter into a signal transmitted from the base station and a signal transmitted from the home zone signal generator;

a frequency down-converter coupled to the output of the duplexer for down-converting the signal generated from the home zone signal generator via the duplexer;

a home zone signal detector coupled to the output of the frequency-down converter for detecting the home zone signal from the down-converted signal;

a signal mode changer coupled to the home zone signal detector for selectively changing a signal mode to match the frequency of the home zone signal generated from the home zone signal generator;

a buzzer coupled to the output of the home zone signal generator for producing an alarm to the subscriber if the home zone signal is detected by the home zone signal detector;

a modulator coupled to the output of the home zone signal generator for modulating the detected home zone signal and for modulating a transmission signal from the subscriber to the base station;

a frequency up-converter coupled to the output of the modulator for up-converting the output signal from the modulator;

a transmission power amplifier for amplifying the output signal from the frequency up-converter; and, a transmission filter coupled to the output of the transmission power amplifier for filtering the amplified signal beyond a given transmission frequency band to prevent interference with a different frequency band when the amplified signal is transmitted to the base station via the antenna.

15. A method for providing a different billing scheme for a call connection in a mobile communication system, the method comprising the steps of:

(1) assigning a first telephone number and a second telephone number to a subscriber and storing the first and the second telephone numbers in a visitor location register;

(2) detecting a home zone signal defining a boundary of a home zone from a home zone signal generator by a mobile terminal, wherein a predetermined area that defines the boundary of the home zone is variable according to the subscriber, and wherein the home zone signal indicates whether the mobile terminal is located within the boundary of the home zone;

(3) transmitting a call information, a mobile identification number, and the home zone signal to a mobile exchange by the base station and checking the information of the base station based on the signal from an access and reverse traffic channel to determine the location of the base station;

(4) selecting one of the first and the second telephone numbers of the subscriber stored in the visitor location register in response to the received mobile identification number and the detected home zone signal by the mobile exchange; and, (5) generating a service charge in response to the call information and one of the selected first and the second telephone numbers received from the mobile exchange.

16. The method as set forth in claim 14, wherein the service charge for the firs telephone number is substantially different from the service charge for the second telephone number.

17. The method as set forth in claim 14, wherein the step (4) comprises the step of selecting the first telephone number if the home zone signal is detected by the mobile terminal, and selecting the second telephone number if the home zone signal is not detected by the mobile terminal.

18. The method as set forth in claim 14, wherein the steps (2), (3), and (4) are performed before the call connection.

19. The method as set forth in claim 14, wherein the steps (2), (3), and (4) are performed after the call connection.

20. The method as set forth in claim 14, wherein the call information represents a duration of the call connection including different time intervals representing switching the time duration between the in/out of the home zone by the mobile terminal during the call connection.

21. A method for providing a different billing scheme for a call connection in a mobile communication system, the method comprising the steps of:

(a) assigning a first telephone number and a second telephone number to a subscriber and storing the first and the second telephone numbers in a visitor location register;

(b) determining whether a mobile terminal has received a home zone signal from a home zone signal generator and transmitting the received home zone signal to a base station by the mobile terminal;

(c) detecting whether the mobile terminal move in/out of the boundary of the home zone during the call connection;

(d) in the event that the mobile terminal does not move in/out of the home zone during the call connection, (d)(i) transmitting information signals including a duration of the call connection, a mobile identification number, and the received home zone signal to a mobile exchange by the base station;

(d)(ii) selecting one of the first and the second telephone numbers stored in the visitor location register corresponding to the mobile identification number and the home zone signal by the mobile exchange;

(d)(iii) generating a service charge in response to the duration of the call information and one of the selected first and the second telephone numbers received from the mobile exchange; and, (e) in the event that the mobile terminal moves in/out of the boundary of the home zone during the call connection, (e)(i) transmitting respective duration of the call connection for each inside the home zone and outside the home zone, the mobile identification number, and respective home zone in/out signal to the mobile exchange by the base station;

(e)(ii) selecting one of the first telephone number and the second telephone number stored in the visitor location register in response to the home zone in/out signal by the mobile exchange; and, (e)(iii) generating a service charge in response to the respective duration of the call connection and each selected first telephone number or the second telephone number received from the mobile exchange.

22. The home zone service method of claim 20, wherein the first telephone number is selected for the call duration for the inside home zone and the second telephone number is selected for the call duration for the outside home zone.

23. The home zone service method of claim 21, wherein the service charge for the call connection for the inside home zone is substantially less than the service charge for the outside home zone.

24. The mobile communication system according to claim 5, wherein the mobile terminal notifies a subscriber during a call that a position of the mobile terminal with respect to being one of inside and outside the home zone boundary has changed.

25. The mobile communication system according to claim 24, wherein the mobile terminal notifies a subscriber by at least one of an audio and a visual notification.

26. The method according to claim 16, further comprising:

(6) notifying the subscriber when a the service charge generated in step (5) changes because a location of the mobile terminal has crossed the home boundary.

\* \* \* \* \*